United States Patent [19]

Dilger et al.

[11] Patent Number: 5,670,876

[45] Date of Patent: Sep. 23, 1997

[54] MAGNETIC DISPLACEMENT SENSOR INCLUDING FIRST AND SECOND FLUX PATHS WHEREIN THE FIRST PATH HAS A FIXED RELUCTANCE AND A SENSOR DISPOSED THEREIN

[75] Inventors: John Patrick Dilger, Marshalltown; Nile Kenton Dielschneider, Conrad; Jerry Marvin Ceaser, Marshalltown, all of Iowa

[73] Assignee: Fisher Controls International, Inc., Austin, Tex.

[21] Appl. No.: 558,689

[22] Filed: Nov. 14, 1995

[51] Int. Cl.⁶ .................. G01R 33/038; G01B 7/14; G01B 7/02
[52] U.S. Cl. .................. 324/207.13; 324/207.22; 324/207.24
[58] Field of Search .................. 324/207.2–207.26, 324/251, 252, 174, 166, 262; 338/32 R, 32 H; 340/870.31

[56] References Cited

U.S. PATENT DOCUMENTS

| | | | |
|---|---|---|---|
| 3,112,464 | 11/1963 | Ratajski et al. | 338/32 |
| 3,777,273 | 12/1973 | Baba et al. | 329/200 |
| 4,532,810 | 8/1985 | Prinz et al. | 73/717 |
| 4,535,289 | 8/1985 | Abe et al. | 324/207.22 |
| 4,745,363 | 5/1988 | Carr et al. | 324/207.2 |
| 4,841,243 | 6/1989 | Bishop | 324/174 |
| 4,870,864 | 10/1989 | Io | 73/517 R |
| 4,901,571 | 2/1990 | Reinhardt et al. | 73/517 R |
| 4,935,698 | 6/1990 | Kawaji et al. | 324/207.2 |
| 4,992,731 | 2/1991 | Lorenzen | 324/174 |
| 5,159,268 | 10/1992 | Wu | 324/207.2 |
| 5,196,794 | 3/1993 | Murata | 324/251 |
| 5,270,645 | 12/1993 | Wheeler et al. | 324/207.12 |
| 5,299,451 | 4/1994 | Brosse | 324/207.2 X |
| 5,300,883 | 4/1994 | Richeson | 324/207.22 |
| 5,321,355 | 6/1994 | Luetzow | 324/207.2 |
| 5,359,288 | 10/1994 | Riggs et al. | 324/207.22 |
| 5,365,791 | 11/1994 | Padula et al. | 73/745 |
| 5,497,081 | 3/1996 | Wolf et al. | 324/207.12 |

FOREIGN PATENT DOCUMENTS

| | | |
|---|---|---|
| 0 516 493 A1 | 12/1992 | European Pat. Off. . |
| 0 575 971 A1 | 12/1993 | European Pat. Off. . |
| 34 10736 A1 | 10/1985 | Germany . |

OTHER PUBLICATIONS

Von Ulrich Eberhardt and Walter Oehler, "Anwendung von Feldplatten beim elektrischen Messen nichtelektrischer" Grössen, 1968.

Patent Abstracts of Japan, vol. 79, No. 90, JP58015113, Apr. 14, 1983.

ICoT Systems Corporation (Westlock), "Smart Position", Product Brochure, Dec. 1985.

Primary Examiner—Sandra L. O'Shea
Assistant Examiner—Roger Phillips
Attorney, Agent, or Firm—Kinney & Lange, P.A.

[57] ABSTRACT

A displacement sensor senses relative displacement between first and second members and includes a housing mounted to the first member. Magnet means having first and second pole tips is mounted to the housing. A flux sensor is mounted to the housing between the first and second pole tips. A target is mounted to the second member to form a flux path between the first and second pole tips having a reluctance that varies with displacement between the first and second members. The arrangement forms a first lossy flux path of fixed reluctance through the flux sensor and a primary flux path through the target. In one form the target has a surface configured to provide a gap height that varies with displacement. In another form the target has a surface configured to provide a target width that varies with displacement. The sensor may be used differentially by arranging two such sensors.

51 Claims, 9 Drawing Sheets

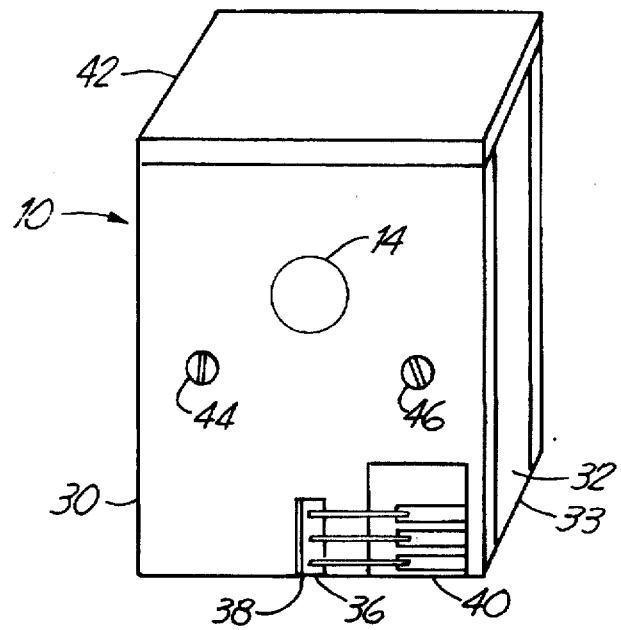
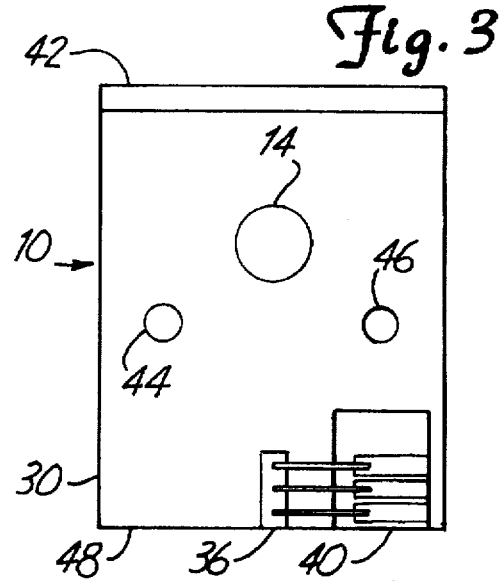
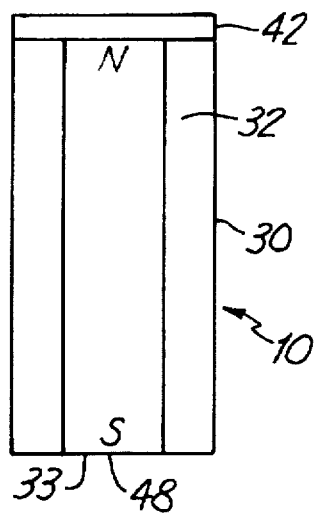
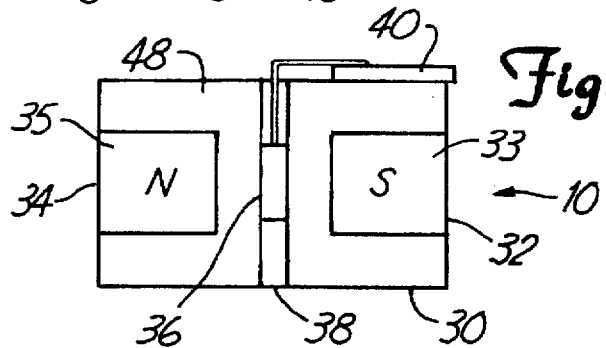

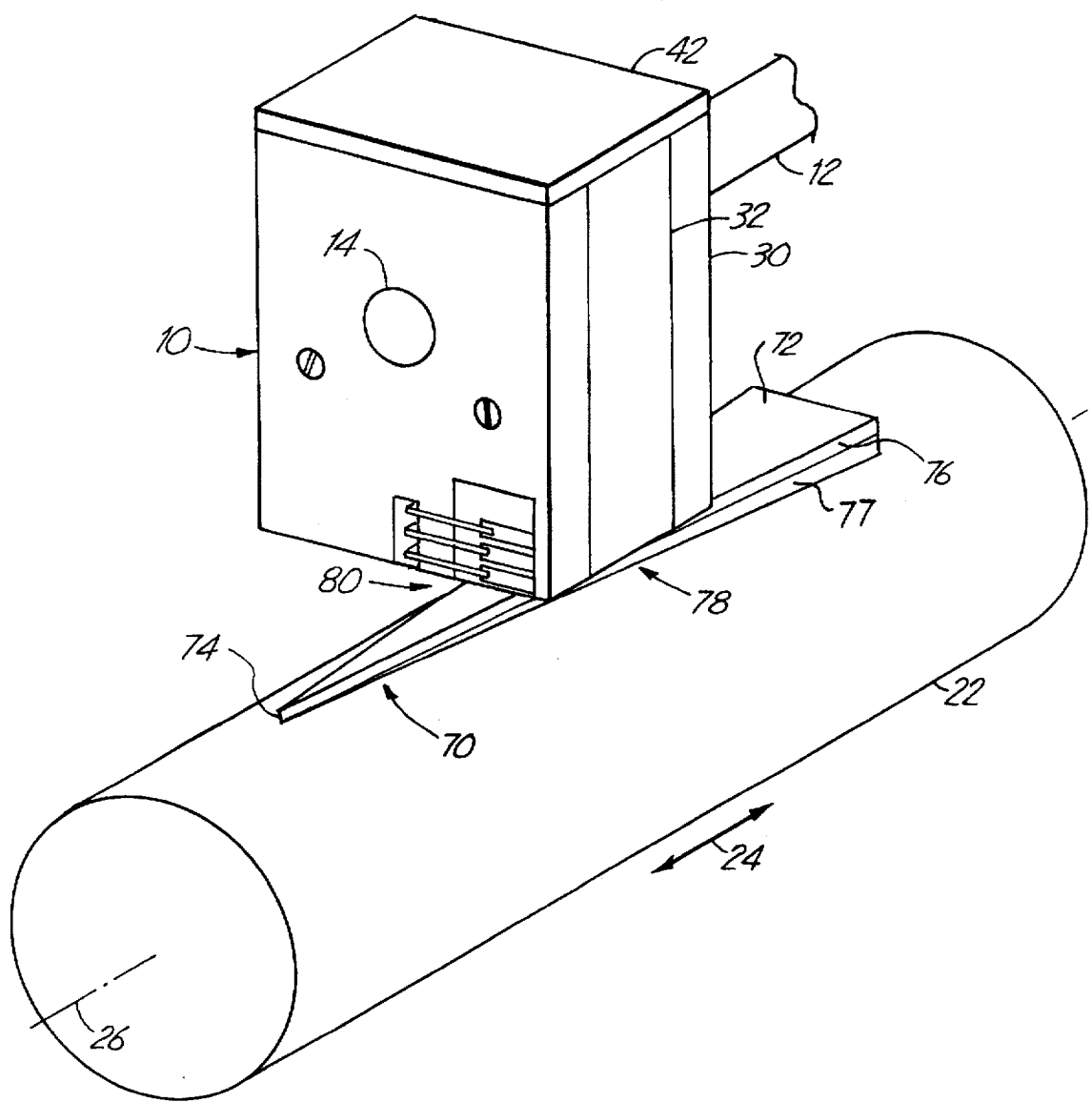

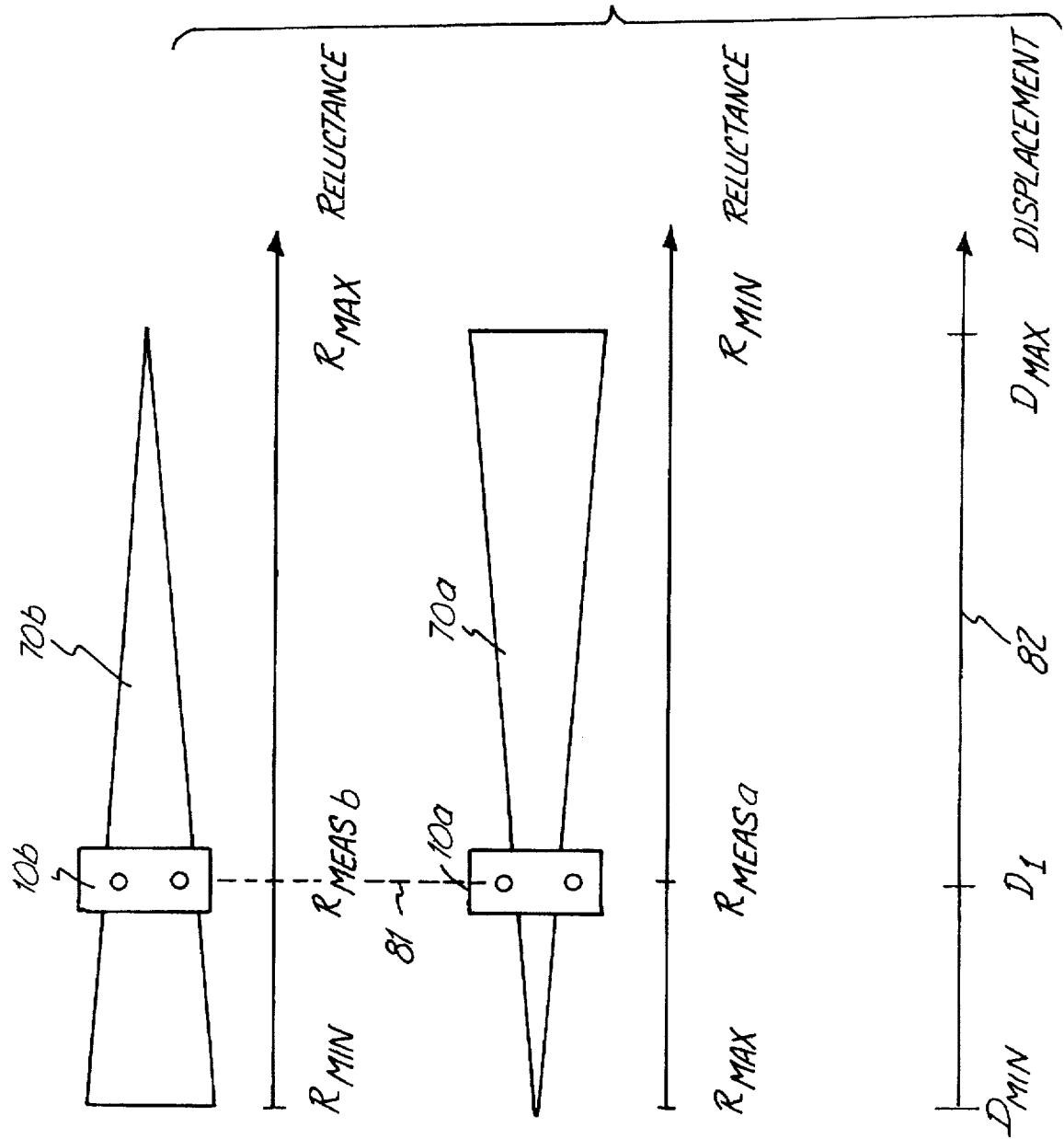

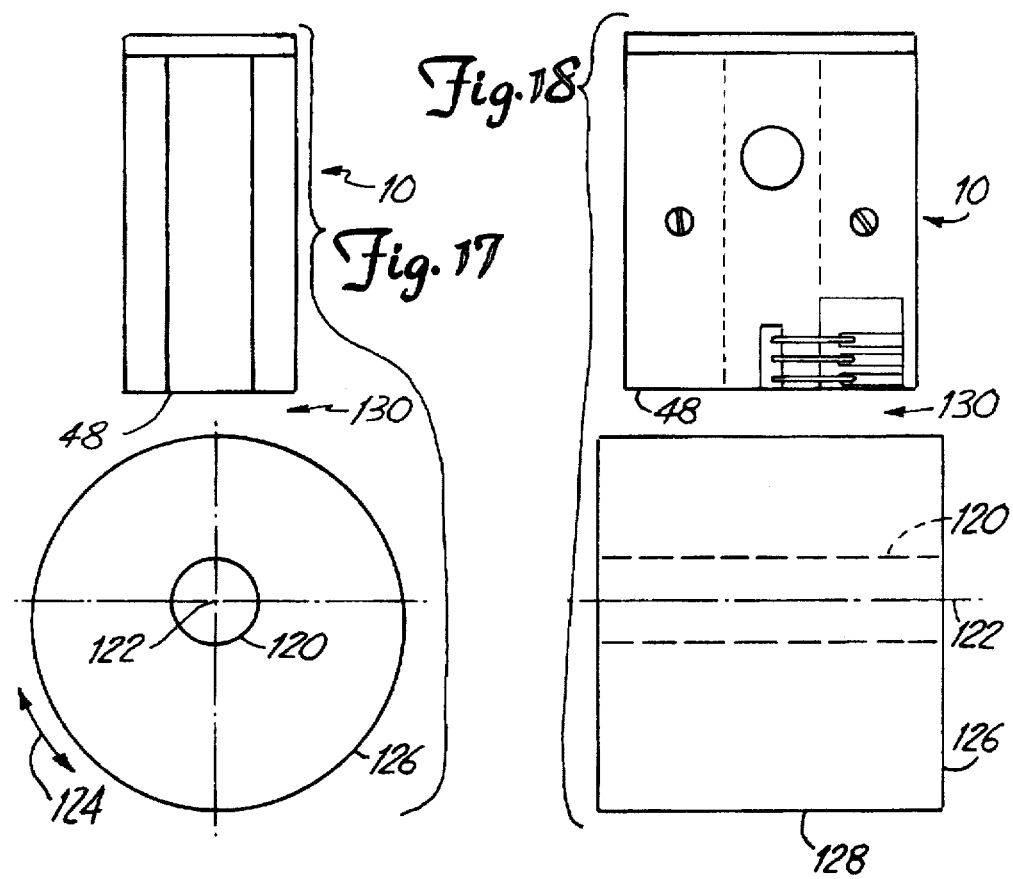
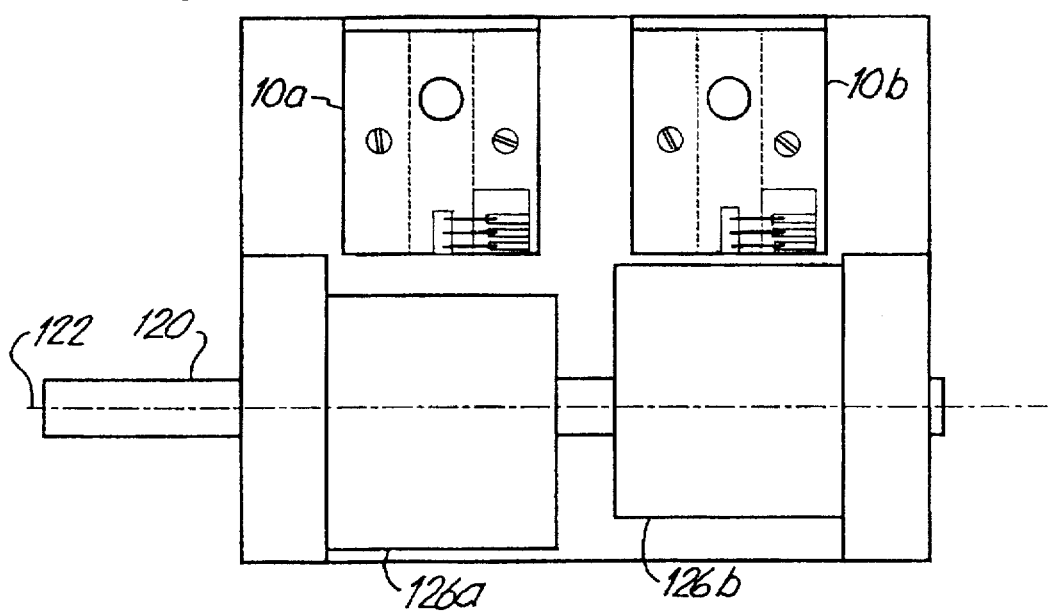

MAGNETIC DISPLACEMENT SENSOR INCLUDING FIRST AND SECOND FLUX PATHS WHEREIN THE FIRST PATH HAS A FIXED RELUCTANCE AND A SENSOR DISPOSED THEREIN

BACKGROUND OF THE INVENTION

The present invention is a magnetic displacement sensor having a magnetic circuit with a reluctance of the magnetic circuit varying with displacement. More specifically, the present invention is a valve position sensor employing a magnetic circuit having a magnetic source and a magnetic flux sensor mounted in fixed relation to a valve and a target on a valve operator forming a flux conduction path having a reluctance that varies with displacement of the valve operator.

Magnetic displacement sensors provide electrical signals indicative of displacement. Generally, such sensors are arranged to provide a magnetic field or magnetic flux that varies with displacement, and a pickup device that detects a change in the magnetic field or magnetic flux. While the displacement can be of any form, typically the displacement will be rotational or linear. Since a magnetic displacement sensor detects displacement of a first member with respect to a second member, a first portion of the sensor must be attached to the first member and a second portion of the sensor must be attached to the second member.

Riggs et at., U.S. Pat. No. 5,359,288, discloses a linear position sensor for use in an automotive suspension system. The sensor comprises a telescopically movable portion and a stationary portion. The movable portion includes permanent magnets arranged such that the intensity of the magnetic field produced by the magnets varies lengthwise along the movable portion. The stationary portion includes a magnetic sensor (such as a Hall effect sensor) that detects the magnetic field produced by the magnets on the movable portion. Accordingly, as the displacement of the movable portion changes with respect to the stationary portion, the magnetic field detected by the sensor changes and the sensor produces a signal representative of displacement.

Baba et al., U.S. Pat. No. 3,777,273, discloses a rotational displacement sensor that uses two magnetic circuit paths. A stationary portion of the sensor includes two magnetic flux sensors, one in each circuit path. The movable portion of the sensor includes an asymmetrical portion that changes the reluctance of the circuit paths based on the rotary position of the movable part. The rotational displacement of the movable portion with respect to the stationary portion is measured on the basis of the ratio of flux passing through each flux sensor.

While Baba et at. and Riggs et al. each disclose magnetic displacement sensors capable of accurately measuring displacement, they, like most magnetic displacement sensors known in the art, deploy significant portions of the sensor on both the stationary and movable members. Therefore, replacement of the sensor often entails replacing both the stationary and movable portions. In addition, many magnetic sensors (such as Baba et al.) require that the displacement to be measured be mechanically linked into the sensor.

Displacement sensors of various types are used in distributed control systems employing field devices, such as valves, that are operated by remote systems. Microprocessors are often employed to monitor and control valve positions. For example, one type of valve is operated by a pressure-responsive diaphragm. A valve operator, such as a shaft, is connected between the diaphragm and the valve and moves linearly to open and dose the valve. A sensor, such as a potentiometer, is coupled to the shaft and provides a signal to the microprocessor representative of linear displacement of the shaft.

Another type of valve is operated by a rotary actuator. A valve operator, such as a shaft, is connected between the rotary actuator and the valve. The operator or shaft rotates with the rotary actuator to open and dose the valve. A sensor is coupled to the shaft to provide a signal to the microprocessor representative of rotational displacement of the shaft.

Magnetic displacement sensors have also been used to sense displacement of linear and rotary valve operators or shafts. These have typically employed a flux sensor mounted to a stationary member and in the flux path of a magnetic source mounted to the operator or shaft. In an example of a displacement sensor for a rotary shaft, the shaft carrying the magnetic source surrounds an eccentrically mounted flux sensor so that the reluctance of the magnetic circuit through the flux sensor varies with rotational displacement. In an example of a displacement sensor for a linearly displaced shaft, the area of the magnetic source confronting the flux sensor varies with linear displacement.

A common problem of the field devices described above resides in the fact that displacement sensors deteriorate over time and need to be replaced. However, replacement of portions of the displacement sensor that are mounted to the movable member is not easily accomplished.

SUMMARY OF THE INVENTION

The present invention is a magnetic displacement sensor that forms a magnetic circuit through stationary and movable portions. The stationary portion of the displacement sensor includes a magnetic source and a magnetic flux sensor. The magnetic source provides a magnetic field and is the source for magnetic flux, and the magnetic flux sensor is positioned in a lossy flux path having a fixed reluctance. The movable portion of the sensor comprises a target that completes a flux conduction path across a gap between the target and the magnetic source, the flux conduction path having a magnetic reluctance that varies with displacement. The variable reluctance path is arranged in parallel to the fixed reluctance path, so that as the reluctance of the variable path changes, flux in the fixed reluctance path through the flux sensor also changes.

The magnetic displacement sensor is used in connection with rotary and sliding operators. More particularly, the target is attached to the moving valve shaft and shaft displacement is sensed by the stationary flux sensor sensing lossy flux from the stationary magnetic source.

One aspect of the present invention resides in a magnetic flux generator and pickup apparatus for a magnetic displacement sensor that senses relative displacement between first and second members, where the displacement sensor has a target mounted to the second member to form a flux path normal to the direction of displacement and has a reluctance that varies with displacement between the first and second members. The flux generator and pickup apparatus includes a housing to be mounted to the first member. Magnet means is mounted to the housing to generate a magnetic flux. The magnet means has first and second pole tips arranged to confront the target along the flux path when the housing is mounted to the first member. A flux sensor is mounted to the housing between the first and second pole tips.

Another aspect of the present invention resides in a displacement sensor for sensing relative displacement between first and second members. The sensor includes a housing to be mounted to the first member. Magnet means having first and second pole tips is mounted to the housing. A flux sensor is mounted to the housing between the first and second pole tips. A target to be mounted to the second member forms a flux path between the first and second pole tips having a reluctance that varies with displacement between the first and second members.

Another aspect of the present invention resides in a displacement sensor having magnet means to be mounted to the first member, the magnet means having first and second pole tips. A magnetic circuit provides a first or primary flux path between the first and second pole tips that contains a target to be mounted to the second member. The magnetic circuit also provides a secondary flux path of fixed reluctance between the first and second pole tips that contains a magnetic flux sensor. The second flux path has a reluctance that varies with displacement between the first and second members.

In one embodiment, the target has a surface whose height varies with displacement to thereby change the gap length between the target and the magnet means. In another embodiment, the target has a surface whose edge is at an acute angle to the direction of displacement to thereby change the gap length between the target and the magnet means. In yet another embodiment, the target is configured so that a surface area of the target confronting the magnet means changes with displacement.

The magnetic displacement sensor of the present invention may also be used differentially to compensate for unwanted variability in the gap between the stationary portion and the movable portion. In the differential embodiment, the stationary and movable portions are arranged to form two magnetic circuits, each having a target path and a lossy path. The target path of one magnetic circuit has an increasing reluctance with displacement in a given direction while the target path of the other magnetic circuit has a decreasing reluctance. By calculating displacement based on the reluctances of the two magnetic circuits, the effects of unwanted variations in gap space are canceled.

In another embodiment, the target includes an eccentric cam or cams arranged to provide a variable height gap between a radially-oriented stationary portion and the cam surface of the target.

BRIEF DESCRIPTION OF THE DRAWINGS

FIG. 2 is a perspective view of a stationary portion for a displacement sensor of the present invention.

FIG. 3 is a front view of the stationary portion shown in FIG. 2.

FIG. 4 is a side view of the stationary portion shown in FIG. 2.

FIG. 5 is a bottom view of the stationary portion shown in FIG. 2.

FIG. 9 is a perspective view, as in FIG. 1, of a magnetic displacement sensor in accordance with a modification of the present invention.

FIG. 13 is a diagram of the target of the differential magnetic displacement sensor of FIG. 12, useful in explaining the operation of the differential displacement sensor.

FIGS. 17 and 18 are frontal and side views, respectively, of a magnetic displacement sensor in accordance with another modification of the present invention.

FIG. 19 is a side view of a differential magnetic displacement sensor in accordance with another modification of the present invention using plural magnetic displacement sensors of FIGS. 17 and 18.

DETAILED DESCRIPTION OF THE PREFERRED EMBODIMENTS

Figure 1:
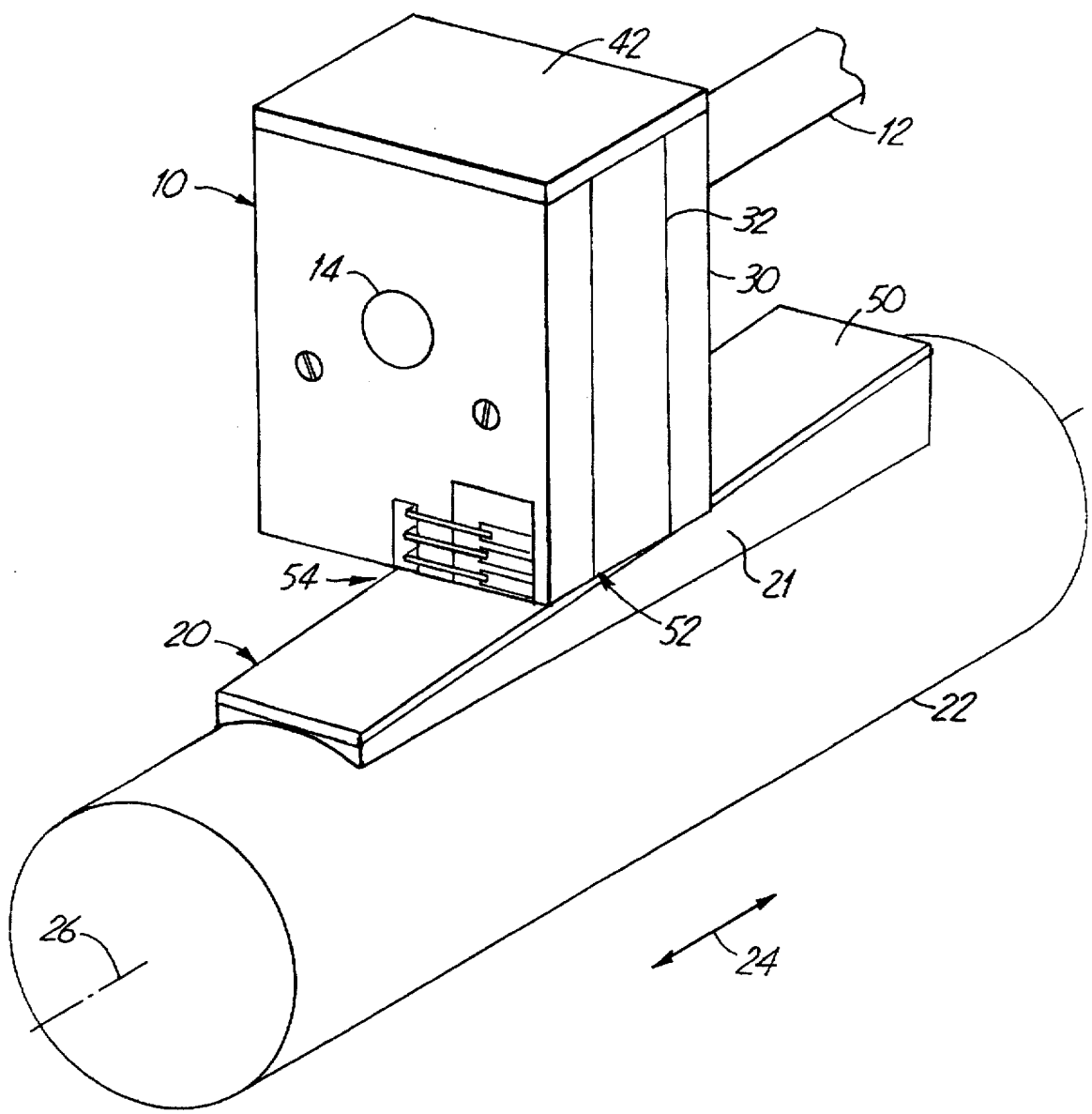
FIG. 1 is a perspective view of a magnetic displacement sensor of the present invention.

FIG. 1 is a perspective view of a magnetic displacement sensor in accordance with the presently preferred embodiment of the present invention. The magnetic displacement sensor comprises a stationary portion 10 (shown in greater detail in FIGS. 2-5) and a target 20. Stationary portion 10 is mounted to a stationary member, such as a valve housing. Conveniently, the valve housing includes a mounting arm 12 which is fastened to portion 10 through mounting hole 14. Target 20 is mounted to the shaft or stem 22 of the valve. The embodiment illustrated in FIG. 1 is arranged for linear or reciprocal movement of shaft 22 in the direction of arrow 24 along axis 26. Shaft 22 is a linear valve operator mounted between a valve actuator, such as a pressure-responsive diaphragm (not shown), and the valve (not shown) under control in a manner well known in the art. Shaft 22 is arranged to reciprocate in the direction of arrow 24 to open and close the valve.

As shown particularly in FIGS. 2-5, stationary portion 10 comprises a housing 30 supporting permanent magnets 32 and 34 at the sides of the housing. Magnets 32 and 34 are arranged so that one of the magnets, such as magnetic 32, has its north pole orientated towards the top of housing 30 and its south pole (pole tip 33) orientated toward the bottom of housing 30. The other magnet, such as magnet 34, is oriented opposite to magnet 32 with its north pole (pole tip 35) at the bottom of housing 30 and its south pole at the top of housing 30. Magnets 32 and 34 are preferably Alnico V magnets. A permanent magnet is preferred because it can be easily incorporated into the sensor and does not require a separate power source. A magnetic field sensor 36, such as an Allegro 3507LU Hall effect sensor, is mounted in slot 38 in the bottom surface 48 of housing 30 between the pole tip 33 of magnet 32 and pole tip 35 of magnet 34. The conductors of sensor 36 are connected to separate terminals on conductor pad 40 for connection to the control equipment, such as a microprocessor. Pole piece 42 is mounted to the top of housing 30 and abuts the north pole of magnet 32 and the south pole of magnet 34. Pole piece 42 is preferably formed of sheet metal or iron to provide a low reluctance path between the north pole of magnet 32 and the south pole of magnet 34. Pole piece 42 is fastened to housing 30 and magnets 32 and 34 by a suitable fastening technique, such as adhesive. It will be appreciated that magnets 32 and 34 and pole piece 42 form a magnetic source forming a constant flux source.

In one form of the invention, housing 30 is formed of a suitable non-magnetic material such as rigid plastic. Non-magnetic fasteners, such as screws 44 and 46 mount magnets 32 and 34 to the housing. Sensor 36 is mounted within slot 38 by a suitable adhesive or other fastening mechanism.

As shown in FIG. 1, target 20 includes a surface 50 that slopes with respect to axis 26. Target 20 is mounted to non-ferromagnetic base or carrier 21 which in turn is mounted to shaft or stem 22 in spaced relation to portion 10 so that target 20 has a uniform thickness. Target 20 has a surface 50 that confronts bottom surface 48 of portion 10 to form gap 52 between target 20 and the pole tip 33 of magnet 32 and gap 54 between target 20 and the pole tip 35 of magnet 34. As shaft 22 reciprocates along its axis, the heights of gaps 52 and 54 change, based upon the lineal position of shaft 22. Target 20 is constructed of a suitable low reluctance material, such as sheet metal or iron. Target 20 provides a flux path between pole tips 33 and 35 normal to the direction of displacement. Since air has a significantly higher reluctance than the material forming target 20, changes in the reluctance of the flux path through target 20 are due primarily to the changes in the heights of gaps 52 and 54 as the lineal positions of shaft 20 changes. It may also be desired to provide a slight curve to surface 50 of target 20 (see FIG. 14) to compensate for any non-linearity of the change of reluctance with the change of gap height.

Figure 6:
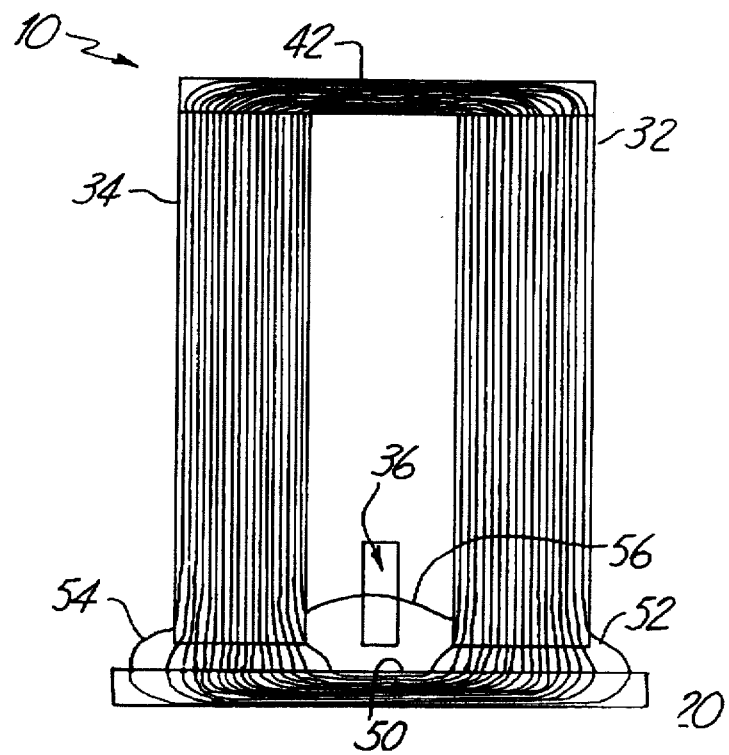
FIGS. 6 and 7 are diagrams illustrating the magnetic circuit of the displacement sensor of FIG. 1.
Figure 7:
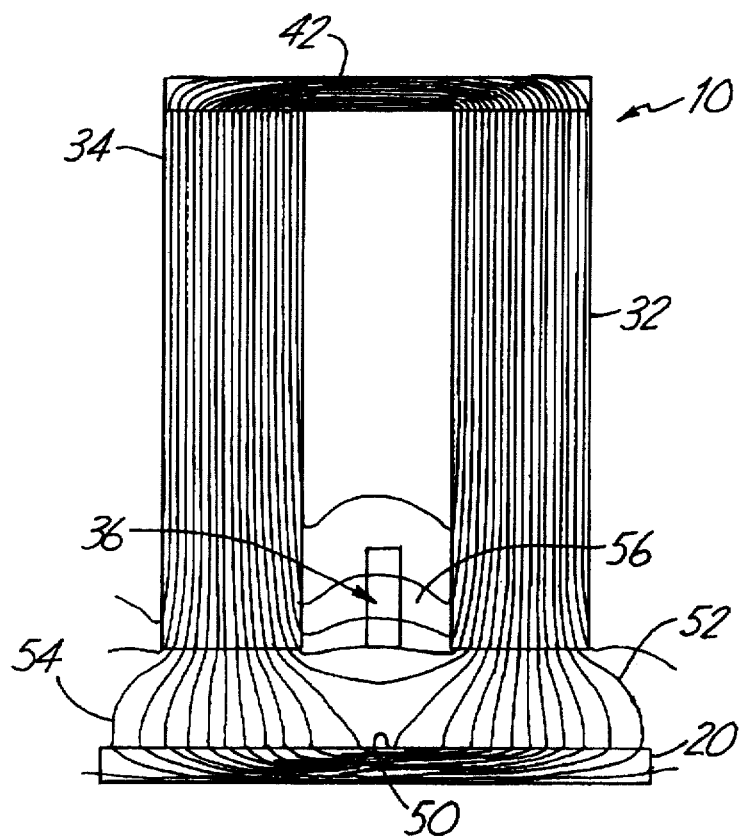
Figure 8:
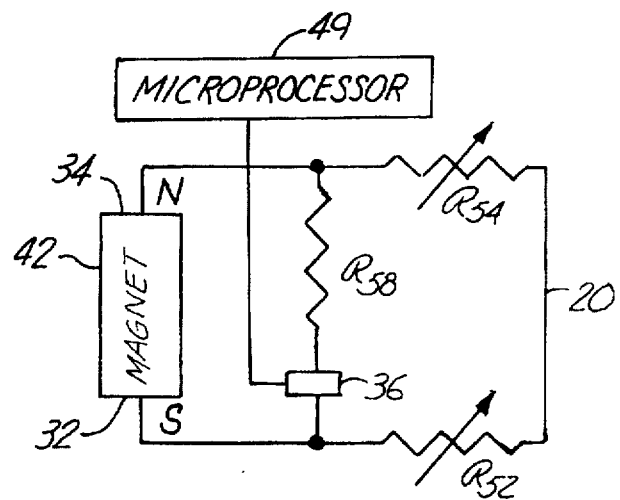
FIG. 8 is a diagram of an equivalent magnetic circuit illustrated in FIGS. 6 and 7.

FIGS. 6–8 illustrate the magnetic circuit of the magnetic displacement sensor illustrated in FIG. 1. As shown in FIGS. 6 and 7, magnet 32, pole piece 42, magnet 34 provides a magnetic field that follows two primary flux paths. One path is through gap 54, target 20 and gap 52. A secondary path 56 of lossy flux, in the form of leakage and hinging flux, extends through sensor 36 between pole tip 33 of magnet 32 and pole tip 35 of magnet 34. The reluctance of lossy flux path 56 is established by the construction of housing 30 and sensor 36, and is therefore known. On the other hand, the reluctance of the path through gaps 52 and 54 is dependant, at least in part, by the heights of those gaps.

Target 20, together with gaps 52 and 54, form a shunt with respect to lossy flux path 56. Any change in the reluctance of the path through target 20 due to changes in the height of gaps 52 and 54 will change the shunt. Since the magnets provide a constant flux source, any change in the reluctance of the path through target 20 will change the flux through that path, thereby changing the amount of lossy flux in path 56. Consequently, the amount of flux passing through sensor 36 is dependant on the height of gaps 52 and 54 and hence the lineal position of shaft 22 with respect to stationary member 10. FIG. 8 illustrates an equivalent magnetic circuit, showing the circuit path formed by reluctances $\Re_{52}$ and $\Re_{54}$ and target 20 in parallel with the fixed reluctance $\Re_{56}$ and sensor 36. As shown in FIG. 8, microprocessor 49 is connected to sensor 36, such as through the terminals on pad 40 (FIGS. 1–5). Microprocessor 49 is connected to the valve actuator to control valve position in a manner well known in the art.

Although the stationary portion 10 of the magnetic displacement sensor is arranged in FIG. 1 so that the magnets 32 and 34 are disposed normal to axis 26 so that the flux path 56 and the flux path through target 20 are normal to axis 26, it may be more convenient in some cases to arrange the stationary portion 10 so that the magnets, flu path 56 and the flux path through target 20 are aligned with, or even at some other angle to, axis 26. Such a modification would simply orient stationary portion 10 at the convenient angle, such as 90° from that shown in FIG. 1. Additionally, although FIG. 1 illustrates surface 48 parallel to axis 26 of shaft 22, it may actually be more convenient to align surface 48 to be parallel to confronting surface 50 of target 20. This can be accomplished, for example, by aligning the axis of mounting arm 12 parallel to the slope of surface 50. Since the permeability of the magnetic target 20 is several thousand times that of air, the majority of the change in reluctance through target 20 is due to the changes in heights of gaps 52 and 54.

Figure 10:
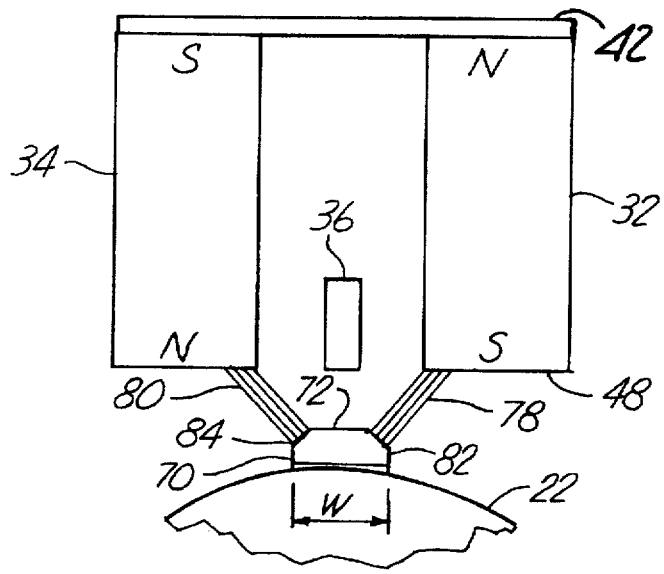
FIG. 10 is a diagram illustrating the magnetic circuit of the displacement sensor of FIG. 9.

FIGS. 9 and 10 illustrate a magnetic displacement sensor in accordance with a modification of the present invention. Like the embodiment illustrated in FIG. 1, the embodiment illustrated in FIGS. 9 and 10 is arranged for linear or reciprocal movement of shaft 22 in the direction of arrow 24 along axis 26. The magnetic displacement sensor comprises a stationary portion 10 (which is the same stationary portion shown in FIGS. 2–5) and a low reluctance target 70. Stationary portion 10 is mounted to a stationary member, such as a valve housing, by mounting arm 12 fastened through mounting hole 14 in member 10. Target 70 is mounted to a base or carrier 77 formed of low permeability material which in turn is mounted to the shaft or stem 22 of the valve. Carrier 77 compensates for the curvature, if any, of shaft or stem 22 so that low reluctance target 70 has a uniform thickness. Target 70 includes a surface 72 parallel to axis 26 of shaft 22. Unlike target 20 in FIG. 1, target 70 is configured so that its edges taper at an acute angle to the direction of movement from an apex 74 to a base 76 at different axial locations along shaft 22. Surface 48 of stationary portion 10 confronts surface 72 of target 70 to form gaps 78 and 80 between the edges of target 70 and magnets 32 and 34. In FIG. 10, the motion of shaft 22 is into and out of the page. While the distance between surface 72 and surface 48 remains substantially constant with movement of shaft 22, the width W of target 70 changes. Accordingly, the length of air gap 78 between target 70 and magnet 32 and the length of air gap 80 between target 70 and magnet 34 change. Therefore, the reluctance of the circuit through target 70 changes with motion into and out of the page and magnetic sensor 36 produces a signal representative of displacement.

The reluctance of the flux path through target 70 illustrated in FIGS. 9 and 10 is based on the distance d between pole tips 33 and 35 of magnets 32 and 34 through target 70. The distance d is equal to the sum of lengths of gaps 78 and 80 and the width W of target 70 normal to the direction of displacement at the region of confrontation with stationary portion 10. Since the permeability of the ferromagnetic target 70 is several thousand times that of air, the majority of the change in reluctance is due to the changes in the lengths of gaps 78 and 80. A small portion of the change is also due to the change in the width W of target 70.

Figure 11:
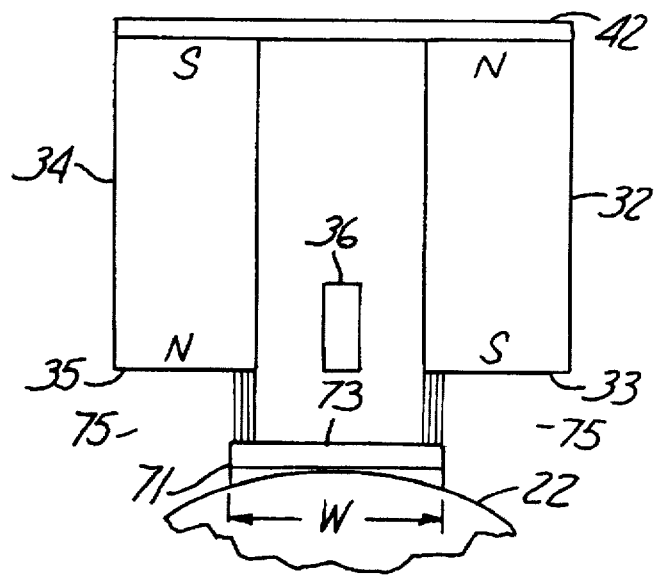
FIG. 11 is a diagram, as in FIG. 10, illustrating the magnetic circuit of a displacement sensor in accordance with a modification of the present invention.

FIG. 11 is a view similar to FIG. 10 illustrating another modification of the target according to the present invention. Target 71 is configured with edges tapered at acute angles to the direction of movement in a manner similar to that shown in FIG. 9, except that target surface 73 of target 71 confronts tips 33 and 35 of magnets 32 and 34 at all axial displacements of target 71 with respect to stationary portion 10. Hence, the gaps 75 between surface 73 and pole tips 33 and 35 are constant, but the width W of target material varies with displacement. As shown in FIG. 11, most of the flux lines between target 71 and magnets 32 and 34 will be concentrated in the region of pole tips 33 and 35 confronting surface 73, with only a small fringing flux extending from the extremities of the pole tips to the edges of the target. As a result, the distance d between pole tips 33 and 35 through target 71 is equal to the sum of gaps 75 (which is constant) and the width W of target 71 normal to the direction of displacement at the region of confrontation with stationary portion 10.

The reluctance of a magnetic circuit using target 70 of FIGS. 9 and 10 or target 71 of FIG. 11 may tend to vary somewhat more non-linearly with displacement than the reluctance of a magnetic circuit using target 20 of FIG. 1, due to non-linearity of the reluctance of the target materials. However, the effect of any non-linearity of reluctance can be compensated by altering the taper defining the width of target 70 or 71 in a non-linear fashion based on empirical observations and/or by employing an empirically-derived look-up table for displacement data in microprocessor 49. The effects of non-linearity of target 70 may be also be compensated by adding chamfer edges 82 and 84 to the edges of target 70 confronting magnets 32 and 34.

As described above, the displacement sensor of the present invention has a gap between stationary portion 10 and the target 20, 70. This gap must be precisely controlled for the sensor to accurately measure displacement. However, wear to mechanical pars introduces play into the displacement sensor, thereby affecting the accuracy of the sensor. In addition, vibration and other environmental factors may make it difficult to precisely control the gap between stationary part 13 and movable part 15.

Figure 12:
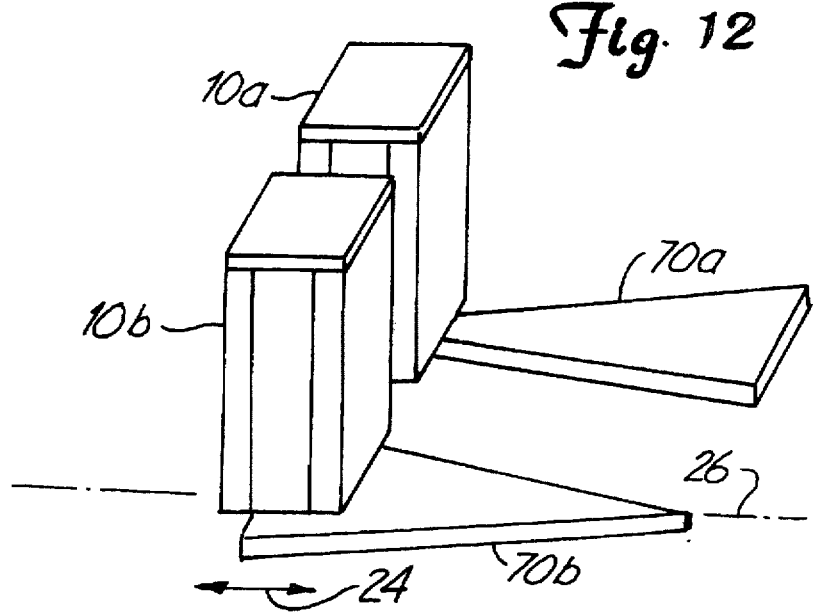
FIG. 12 is a diagram illustrating a differential magnetic displacement sensor in accordance with a modification of the present invention using plural magnetic displacement sensors of FIG. 9.

To overcome the difficulties associated with gap control, two displacement sensors are differentially arranged to correct for gap error. FIGS. 12 and 13 illustrate a differential sensor comprising a pair of displacement sensors, as in FIG. 9, having respective stationary portions 10a and 10b coupled by linkage 81 (FIG. 13) and confronting respective targets 70a and 70b. Targets 70a and 70b are arranged so that they taper in opposite directions along the axis of the movable member to which they are attached. Thus, the apex of target 70a is arranged axially adjacent the base of target 70b, and the base of target 70a is axially adjacent the apex of target 70b.

FIG. 13 illustrates linear displacement of the targets along line 82 over a range between $D_{MIN}$ and $D_{MAX}$. Target 70a is arranged to provide increasing reluctance from $D_{MIN}$ to $D_{MAX}$, and decreasing reluctance from $D_{MIN}$ to $D_{MAX}$. As target 70a moves from $D_{MIN}$ to $D_{MAX}$, the reluctance of the magnetic circuit formed by stationary portion 10a and target 70a varies from $\Re_{MIN}$ to $\Re_{MAX}$. At intermediate displacement $D_1$, the reluctance is $\Re_{MEAS_a}$. Likewise, as target 70b moves between $D_{MIN}$ to $D_{MAX}$, the reluctance of the magnetic circuit formed by stationary part 92 and target 90 varies from $\Re_{MAX}$ to $\Re_{MIN}$. At intermediate displacement $D_1$, the reluctance is $\Re_{MEAS_b}$.

If an error is introduced into the gap between the stationary portions and the targets, such as by wear or misalignment, one sensor will overestimate actual displacement while the other sensor will underestimate actual displacement. Moreover, each sensor will have the same error. As a result, the average of the measured displacement will equal the actual displacement. Hence misalignment due to manufacturing tolerance, wear, materials or environmental conditions affects the stationary parts and targets uniformly.

To measure displacement employing the displacement sensor illustrated in FIGS. 12 and 13, output signals from magnetic flux sensors 36 in each of stationary portions 10a and 10b provide outputs signals Va and Vb respectively. One common differential output of the two flux sensors is based on the relationship $$V_{diff} = \frac{Va - Vb}{Va + Vb}$$

but other well-known relationships may also be employed. Hence, by differentially measuring the output signals from flux sensors 36 of stationary portions 10a and 10b, common mode errors are eliminated. Hence the differential signal is an accurate representation of the displacement of the valve operator.

Figure 14:
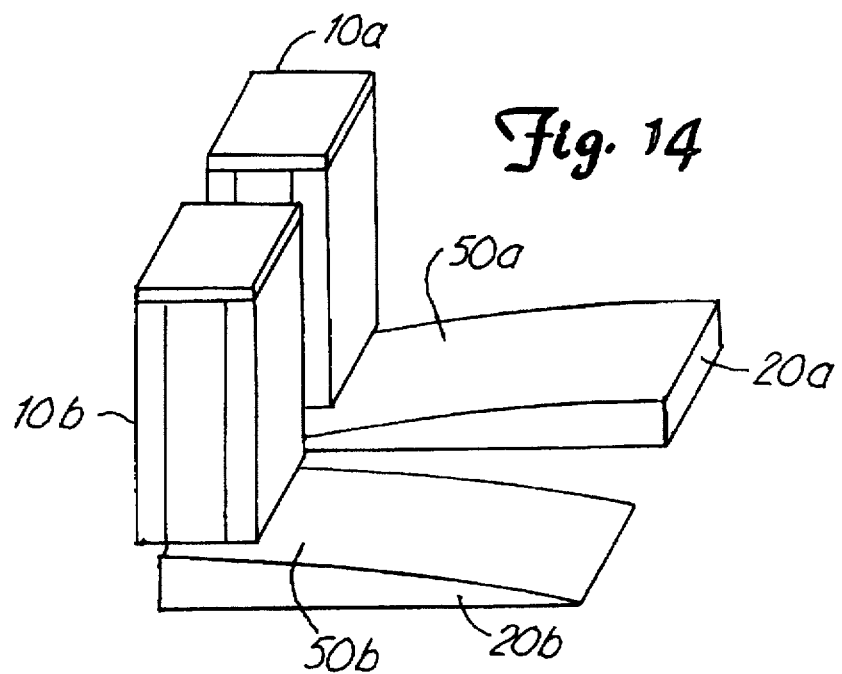
FIG. 14 is a diagram, as in FIG. 12, illustrating a differential magnetic displacement sensor in accordance with a modification of the present invention using plural magnetic displacement sensors of FIG. 1.

FIG. 14 illustrates a differential sensor comprising a pair of displacement sensors, as in FIG. 1, having respective stationary portions 10a and 10b confronting respective targets 20a and 20b. Targets 20a and 20b are arranged so that they slope in opposite directions along the axis of the movable member to which they are attached. Thus, surface 50a of target 20a slopes toward axis 26 as surface 50b of target 20b slopes away from axis 26. The differential sensor shown in FIG. 14 operates similarly to that illustrated in FIGS. 12 and 13.

Figure 15:
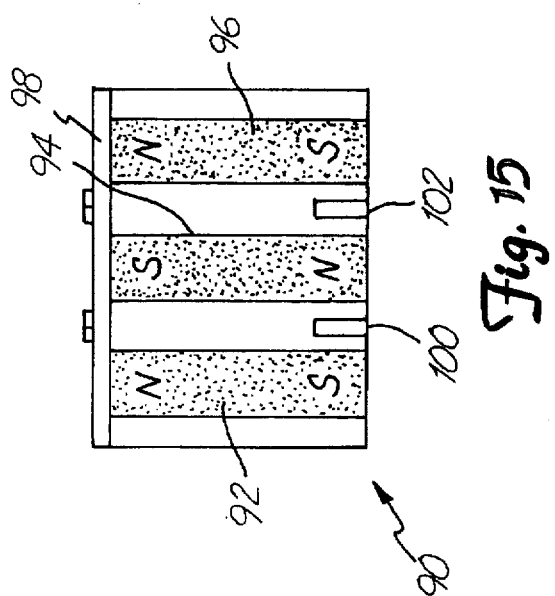
FIG. 15 is a diagram of a stationary portion for a differential magnetic displacement sensor according to another modification of the present invention.

While the embodiments employing differential sensors described in connection with FIGS. 12–14 may be utilized with two displacement sensors as described above, FIG. 15 illustrates a differential displacement sensor 90 employing three magnets 92, 94, and 96, pole piece 98 and magnetic field sensors 100 and 102. The sensor operates in the manner described above, except that magnet 94 is common to the two magnetic circuits of the differential pair. Hence, magnet 94 is oriented oppositely from magnets 92 and 96.

Figure 16:
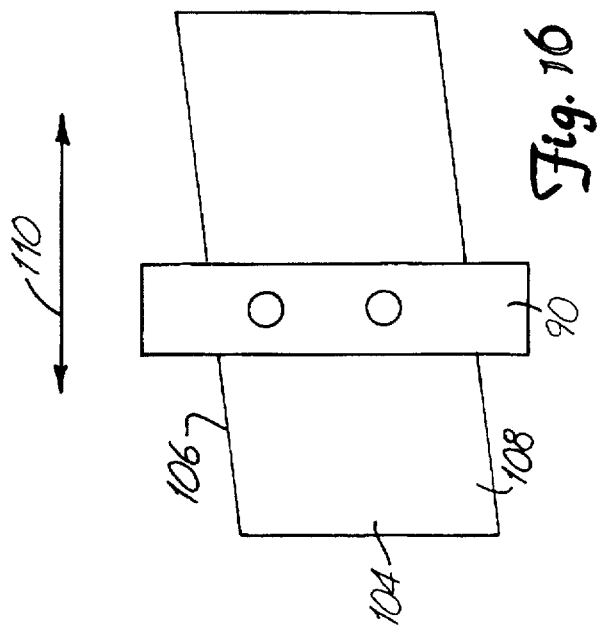
FIG. 16 is a top view of a target for a differential magnetic displacement sensor in accordance with another modification of the present invention.

It is also possible to employ a single target for the differential sensor. FIG. 16 is a top view of differential sensor 90 of FIG. 15, arranged adjacent a parallelogram-shaped target 104. Edges 106 and 108 are each at an acute angle to the direction of motion 110, as linear motion occurs in the direction shown by arrow 110, the reluctance of one magnetic circuit increases while the reluctance of the other magnetic circuit decreases thereby providing a differential displacement measurement as described above. Target 104 may be used with the differential sensor 90 as shown, or with two separate sensors as described in conjunction with FIGS. 12–14.

FIGS. 17 and 18 illustrate a magnetic displacement sensor for use with a rotary actuator. In this case a rotary actuator 120 is arranged to rotate about axis 122 in the direction of arrow 124 (FIG. 17). Target 126 is a cylindrical cam eccentrically mounted to the shaft of actuator 120. Cam 126 is constructed of a high permeable material, such as iron. The surface 128 of cam 126 confronts surface 48 of stationary portion 10 across gap 130. Stationary portion 10 is described above in connection with FIGS. 1–5.

In operation of the sensor illustrated in FIGS. 17 and 18, as actuator shaft 120 is rotated about axis 122, cam 126 is rotated, causing surface 128 to move closer or farther from surface 48 of stationary portion 10. The flux path through cam 126 is parallel to axis 122 and normal to the plane of rotation of the shaft. Hence, gap 130 between surface 128 and the magnets of stationary portion 10 changes in length, based on the radial position of shaft 120. Change in the length of gap 130 changes the reluctance of the magnetic circuit through cam 126, thereby changing the amount of flux along the lossy path between the magnets and through the magnetic flux sensor as heretofore described.

FIG. 19 illustrates a differential magnetic displacement sensor employing a pair of rotary sensor illustrated in FIGS. 17 and 18. In the case of the sensor shown in FIG. 19, cams 126a and 126b are eccentrically mounted to shaft 120, as described in connection with FIGS. 17 and 18, except that the eccentric mounting of cams 126a and 126b are offset 180° so that as the surface of one of cams 126a and 126b moves closer to its respective stationary portion 10a or 10b, the surface of the other of cams 126a and 126b moves away from its respective stationary portion 10a or 10b. Thus, as the surface of cam 126 a moves closer to stationary portion 10a, the surface of cam 126b moves away from stationary portion 10b, and vice versa. The magnetic flux sensors of stationary portions 10a and 10b provides signals to cancel common mode errors in the manner described in connection with FIGS. 12–16.

It will be appreciated to those skilled in the art that the target for the rotary displacement sensor may be configured as a section of changing axial width by "wrapping" the target 70 shown in FIG. 9 or the target 104 shown in FIG. 16 about the axis of the shaft for radial position sensing. Those skilled in the art will also recognize other types of targets may be used to achieve the same functionality. For example, a target formed of a material having a magnetic permeability that changes with displacement would be suitable for use with displacement sensors of the present invention. In any case, the target need not be constructed of special materials, such as Carpenter 49 or HyMu 80 material used in previous sensors. Instead, low grade magnetic materials may be employed for both the target as well as pole piece 42.

Additionally, the present invention may be accomplished through the use of cast Alnico V magnets, rather than more expensive rare earth magnets or other magnetic sources of high cost. Therefore, the sensor of the present invention may be achieved relatively inexpensively and highly effectively.

The present invention also provides a magnetic displacement sensor having interchangeable parts. More particularly, stationary member 10 may be employed in both rotary and linear displacement sensors, so that manufacturing and inventory concerns dealing with several models and classes of sensors may be minimized by employing the same model of stationary portion 10 in several types or classes of sensors.

It will be appreciated to those skilled in the art that while targets 20 and 70 are illustrated as mounted to high reluctance bases or carriers so that the target thickness is substantially constant over the displacement range, the carrier may be eliminated where the valve stem itself provides a flat surface at the correct slope for the target (parallel to the direction of displacement in the case of target 70 or acute to the direction of displacement in the case of target 20). Alternatively, the carrier may simply be an integral part of the target, in which case the target may have a variable thickness along the direction of displacement, adding to nonlinearity of the sensor and the need to compensate for non-linearity by adjusting the shape of the target based on empirical observations or by using look-up tables in the microprocessor based on empirical data as herein described. Likewise, linearity issues of the rotary sensors illustrated in FIGS. 17–19 can be addressed by empirically adjusting the cam offset from the axis of rotation of the actuator, and the relative radial positions of the cams in the case of the differential sensor of FIG. 19.

The present invention provides a noncontacting magnetic displacement sensor that minimizes that number of components required to be attached to the object whose displacement is being measured. In many applications, the target can be formed into the object whose displacement is being measured. For example, a metal piston can be formed with a wedge-shaped portion or an eccentric cam that can be used to form the magnetic circuit with the stationary part of the sensor described above.

Since the moving object requires a minimal number of components, replacing or servicing the sensor merely entails replacing the stationary part. This feature is particularly advantageous because many prior sensors employed permanent magnets on the movable portion of the sensor, and a magnetic field sensor on the stationary part of the sensor. Since permanent magnet field strength tends to weaken over time, and the magnetic field sensor may malfunction, servicing prior sensors often required replacing both the movable part and the stationary part. By incorporating both the permanent magnets and the field sensor in a single part, repair and replacement costs are minimized.

Although the present invention has been described with reference to preferred embodiments, workers skilled in the art will recognize that changes may be made in form and detail without departing from the spirit and scope of the invention.

What is claimed is:

1. A displacement sensor for sensing relative displacement between a valve housing and a movable valve operator comprising:

magnet means for mounting to the valve housing, the magnet means having first and second pole tips;

a magnetic flux sensor for mounting to the valve housing between the first and second pole tips; and a magnetic circuit having a first flux path between the first and second pole tips containing the magnetic flux sensor, the first flux path having a fixed reluctance and the sensor being arranged to sense magnetic flux in the first flux path, and a second flux path between the first and second pole tips containing a target for mounting to the valve operator, the second flux path having a reluctance that varies with displacement between the valve operator and the valve housing.

2. The displacement sensor of claim 1 wherein the target includes a target surface so disposed and arranged with respect to the magnet means as to form first and second gaps between the target surface and the respective first and second pole tips, the target having a width between the first and second gaps that varies with displacement between the valve operator and the valve housing.

3. The displacement sensor of claim 2 wherein the first and second gaps each has a length that is substantially constant with displacement between the valve operator and the valve housing.

4. The displacement sensor of claim 1 wherein the target includes a target surface so disposed and arranged with respect to the magnet means as to form a gap between the target surface and at least one of the pole tips, the gap having a length that varies with displacement between the valve operator and the valve housing.

5. The displacement sensor of claim 4 wherein the target surface is disposed at an acute angle to a direction of displacement between the valve operator and the valve housing.

6. The displacement sensor of claim 4 wherein the target surface is disposed substantially parallel to a direction of displacement and includes at least one edge disposed at an acute angle to the direction of displacement, the gap being formed between the edge and the at least one pole tip.

7. The displacement sensor of claim 4 wherein the relative displacement is rotational and the target surface is cylindrical.

8. The displacement sensor of claim 7 wherein the valve operator is rotated about an axis and the target surface is eccentric to the axis.

9. The displacement sensor of claim 4 wherein the relative displacement is linear and the target surface is planar.

10. The displacement sensor of claim 1 wherein the target is formed of a material having a high magnetic permeability.

11. The displacement sensor of claim 1 including processor means coupled to the magnetic flux sensor for providing a signal representative of displacement based on flux sensed by the magnetic flux sensor.

12. The displacement sensor of claim 1 including a sensor housing for mounting to the valve housing, the first-named magnet means being mounted to the sensor housing the first-named magnetic flux sensor being mounted to the sensor housing between the first and second pole tips of the first magnet means, second magnet means mounted to the sensor housing having first and second pole tips, a second magnetic flux sensor mounted to the sensor housing to sense magnetic flux in a third flux path having a fixed reluctance between the first and second pole tips of the second magnet means, the target having at least one target surface so disposed and arranged with respect to the first and second magnet means as to form at least a first gap in the second flux path between the target surface and the first magnet means and a second gap in a fourth flux path between the target surface and the second magnet means, the first and second gaps having respective lengths that vary oppositely with displacement between the valve operator and the valve housing.

13. The displacement sensor of claim 12 wherein the target surface includes first and second edges disposed at acute angles to a direction of displacement between the valve operator and the valve housing, the second flux path being formed between the first edge and the first magnet means and the fourth flux path being formed between the second edge and the second magnet means.

14. The displacement sensor of claim 12 wherein the first magnet means includes a first and a second permanent magnet and the second magnet means comprises the second and a third permanent magnet, the first, second and third magnets forming the second flux path across the first gap between the first permanent magnet and the target surface, and the fourth flux path across the second gap between the third permanent magnet and the target surface.

15. The displacement sensor of claim 12 including processor means coupled to the first and second magnetic flux sensors for providing a signal representative of displacement based on flux sensed by the first and second flux sensors.

16. The differential displacement sensor of claim 15 wherein the processor means computes the displacement based on the relationship $$\frac{V_1 - V_2}{V_1 + V_2}$$

where $V_1$ is a signal representative of the flux sensed by the first magnetic flux sensor and $V_2$ is a signal representative of the flux sensed by the second magnetic flux sensor.

17. A displacement sensor for sensing relative displacement between a valve housing and a movable valve operator comprising:
   a sensor housing for mounting to the valve housing;
   magnet means mounted to the sensor housing, the magnet means having first and second pole tips;
   a flux sensor mounted to the sensor housing to sense magnetic flux in a first flux path between the first and second pole tips, the first flux path having a fixed reluctance; and
   a target for mounting to the valve operator to form a second flux path between the first and second pole tips having a reluctance that varies with displacement between the valve operator and the valve housing.

18. The displacement sensor of claim 17 wherein the target includes a target surface so disposed and arranged with respect to the magnet means as to form first and second gaps in the second flux path between the target surface and the respective first and second pole tips, the target having a width between the first and second gaps that varies with displacement between the valve operator and the valve housing.

19. The displacement sensor of claim 18 wherein the first and second gaps each has a length that is substantially constant with displacement between the valve operator and the valve housing.

20. The displacement sensor of claim 17 wherein the target includes a target surface so disposed and arranged with respect to the magnet means as to form a gap in the second flux path between the target surface and at least one of the first and second pole tips, the gap having a length that varies with displacement between the valve operator and the valve housing.

21. The displacement sensor of claim 20 wherein the target surface is disposed at an acute angle to a direction of displacement between the valve operator and the valve housing.

22. The displacement sensor of claim 20 wherein the target surface is disposed substantially parallel to a direction of displacement and includes at least one edge disposed at an acute angle to the direction of displacement, the second flux path including a gap between the edge and the at least one pole tip.

23. The displacement sensor of claim 20 wherein the relative displacement is rotational and the target surface is cylindrical.

24. The displacement sensor of claim 23 wherein the valve operator is rotated about an axis and the target surface is eccentric to the axis.

25. The displacement sensor of claim 20 wherein the relative displacement is linear and the target surface is planar.

26. The displacement sensor of claim 17 wherein the target is formed of a material having a high magnetic permeability.

27. The displacement sensor of claim 17 including processor means coupled to the flux sensor, the flux sensor providing a signal representative of displacement based on flux sensed by the flux sensor.

28. The displacement sensor of claim 17 including second magnet means mounted to the sensor housing, the second magnet means having first and second pole tips, a second flux sensor mounted to the sensor housing to sense magnetic flux in a third flux path between the first and second pole tips of the second magnet means, the target having at least one target surface so disposed and arranged with respect to the first and second magnet means as to form at least a first gap between the target surface and the first magnet means and a second gap between the target surface and the second magnet means, the first and second gaps having respective lengths that vary oppositely with displacement between the valve operator and the valve housing.

29. The displacement sensor of claim 28 wherein the target surface includes first and second edges disposed at acute angles to a direction of displacement between the valve operator and the valve housing, the first gap being formed between the first edge and the first magnet means and the second gap being formed between the second edge and the second magnet means.

30. The displacement sensor of claim 28 wherein the first magnet means comprises a first and a second permanent magnet and the second magnet means comprises the second and a third permanent magnet, the first, second and third permanent magnets forming the second flux path across the first gap between the first magnet and the target surface, and a fourth flux path across the second gap between the third magnet and the target surface.

31. The displacement sensor of claim 28 including processor means coupled to the first and second flux sensors, the flux sensors providing a signal representative of displacement based on flux sensed by the first and second flux sensors.

32. The differential displacement sensor of claim 28 wherein the processor means computes the displacement based on the relationship $$\frac{V_1 - V_2}{V_1 + V_2}$$

where $V_1$ is a signal representative of the flux sensed by the first flux sensor and $V_2$ is a signal representative of the flux sensed by the second flux sensor.

33. A differential displacement sensor for sensing relative displacement between first and second members, comprising:

first and second magnet means for mounting to the first member, the first and second magnets means each having first and second pole tips;

a target for mounting to the second member;

a first magnetic circuit having
  a first flux path between the first and second pole tips of the first magnet means and containing a first magnetic flux sensor mounted between the first and second pole tips of the first magnet means to sense magnetic flux in the first flux path, the first flux path having a fixed reluctance, and
  a second flux path between the first and second pole tips of the first magnet means and containing at least a portion of the target, the second flux path having a reluctance that varies with displacement between the first and second members; and a second magnetic circuit having
  a third flux path between the first and second pole tips of the second magnet means and containing a second magnetic flu sensor mounted between the first and second pole tips of the second magnet means to sense magnetic flux in the third flux path, the third flux path having a fixed reluctance, and
  a fourth flux path between the first and second pole tips of the second magnet means and containing at least a portion of the target, the fourth flux path having a reluctance that varies with displacement between the first and second members, the reluctance in the fourth flux path increases as the reluctance in the second flux path decreases.

34. The differential displacement sensor of claim 33 wherein the first and second magnetic flux sensors provide a signal representative of displacement based on flux sensed by the first and second flux sensors.

35. The differential displacement sensor of claim 33 including processor means for computing the displacement based on the relationship $$\frac{V_1 - V_2}{V_1 + V_2}$$

where $V_1$ is a signal representative of the flux sensed by the first flux sensor and $V_2$ is a signal representative of the flux sensed by the second flux sensor.

36. The differential displacement sensor of claim 33 wherein the target has a target surface so disposed and arranged with respect to the first magnet means to form a first gap between the target surface and the first magnet means and a second gap between the target surface and the second magnet means, the target surface including first and second edges disposed at acute angles to a direction of displacement between the first and second members, the first gap including a length between the first magnet means and the first edge and the second gap including a length between the second magnet means and the second edge.

37. A differential displacement sensor for sensing relative displacement between first and second members comprising:

a housing for mounting to the first member;

first and second magnet means mounted to the housing, the first and second magnet means each having first and second pole tips;

a first flux sensor mounted to the housing to sensing magnetic flux in a first flux path between the first and second pole tips of the first magnet means, the first flux path having a fixed reluctance;

a second flux sensor mounted to the housing to sensing magnetic flux in a second flux path between the first and second pole tips of the second magnet means, the second flux path having a fixed reluctance; and a target for mounting to the second member to form a third flux path between the first and second pole tips of the first magnet means and to form a fourth flux path between the first and second pole tips of the second magnet means, the third and fourth flux paths each having a reluctance that varies with displacement between the first and second members, the reluctance of the third flux path increasing as the reluctance in the fourth flux path decreases.

38. The differential displacement sensor of claim 37 wherein the target has a target surface so disposed and arranged with respect to the first magnet means to form a first gap between the target surface and the first magnet means and a second gap between the target surface and the second magnet means, the target surface including first and second edges disposed at acute angles to a direction of displacement between the first and second members, the first gap including a length between the first magnet means and the first edge and the second gap including a length between the second magnet means and the second edge.

39. In a valve having a housing and a movable valve operator, a displacement sensor for sensing relative displacement of the valve operator with respect to the housing, the sensor comprising:

a source of constant magnetic flux mounted to the housing;

magnetic flux sensing means magnetically coupled to the source to sense magnetic flux in a first flux path having a reluctance independent of the displacement between the valve operator and the housing; and a target mounted to the valve operator having a target surface confronting the source, the target being magnetically coupled to the source in a second flux path having a reluctance that varies with displacement between the valve operator and the housing so that magnetic flux in the second flux path varies with displacement between the valve operator and the housing to alter the flux in the first flux path.

40. The displacement sensor of claim 39 wherein the target surface is disposed at an acute angle to a direction of displacement between the valve operator and housing.

41. The displacement sensor of claim 39 wherein the target surface is disposed substantially parallel to a direction of displacement and includes at least one edge disposed at an acute angle to the direction of displacement, the gap being formed between the edge and the source of magnetic flux.

42. The displacement sensor of claim 39 wherein the relative displacement is rotational and the target surface is cylindrical.

43. The displacement sensor of claim 42 wherein the valve operator is rotated about an axis and the target surface is eccentric to the axis.

44. The displacement sensor of claim 39 wherein the relative displacement is linear and the target surface is planar.

45. Magnetic flux generator and pickup apparatus for a magnetic displacement sensor that senses relative displacement between a valve housing and a movable valve operator, the displacement sensor having a target mounted to the valve operator, the apparatus comprising:

a sensor housing for mounting to the valve housing;

magnet means mounted to the sensor housing for generating a magnetic flux, the magnet means having first and second pole tips arranged to confront the valve operator when the sensor housing is mounted to the valve housing, the target forming a first flux path between the first and second pole tips having a reluctance that varies with displacement between the valve operator and the valve housing; and a flux sensor mounted to the sensor housing between the first and second pole tips, the sensor sensing magnetic flux in a second flux path between the first and second pole tips having a fixed reluctance.

46. The apparatus of claim 45 including second magnet means mounted to the sensor housing, the second magnet means having first and second pole tips arranged to confront the target when the sensor housing is mounted to the first member, and a second flux sensor mounted to the sensor housing between the first and second pole tips of the second magnet means.

47. The apparatus of claim 46 wherein the first-named magnet means comprises a first and a second permanent magnet and the second magnet means comprises the second and a third permanent magnet, an end of the first magnet forming the first pole tip of the first magnet means, an end of the second magnet forming the second pole tip of the first magnet means and the first pole tip of the second magnet means and an end of the third magnet forming the second pole tip of the second magnet means, the apparatus further including a pole piece bridging ends of the first, second and third magnets opposite from the pole tips.

48. The apparatus of claim 45 wherein the magnet means comprises a first and a second permanent magnet, an end of the first magnet forming the first pole tip and an end of the second magnet forming the second pole tip, the apparatus further including a pole piece bridging ends of the first and second magnets opposite from the pole tips.

49. A displacement sensor for sensing relative displacement between a valve housing and a movable valve operator comprising:

a source of constant magnetic flux mounted to the valve housing;

magnetic flux sensing means magnetically coupled to the source to sense magnetic flux in a first flux path having a reluctance independent of the displacement between the valve operator and the valve housing; and a target mounted to the valve operator and confronting the source, the target being magnetically coupled to the source in a second flux path having a reluctance that varies with displacement between the valve operator and the valve housing so that magnetic flux in the second flux path varies with displacement of the valve operator and the valve housing to alter the flux in the first flux path.

50. The displacement sensor of claim 49 wherein the target has a target surface so disposed and arranged with respect to the first portion as to form first and second gaps between the target surface and the first portion, the target having a width between the first and second gaps that varies with displacement between the valve operator and the valve housing.

51. The displacement sensor of claim 50 wherein the first and second gaps each has a length that is substantially constant with displacement between the valve operator and the valve housing.

* * * * *

UNITED STATES PATENT AND TRADEMARK OFFICE
CERTIFICATE OF CORRECTION

PATENT NO. : 5,670,876
DATED : SEPTEMBER 23, 1997
INVENTOR(S) : JOHN P. DILGER, NILE KENTON DIELSCHNEIDER, JERRY MARVIN CEASER

It is certified that error appears in the above-indentified patent and that said Letters Patent is hereby corrected as shown below:

Col. 13, line 53, delete "flu", insert --flux--

Signed and Sealed this

Eighteenth Day of August, 1998

Attest:

BRUCE LEHMAN

*Attesting Officer*      *Commissioner of Patents and Trademarks*